(12) United States Patent
Graves et al.

(10) Patent No.: US 7,096,350 B2
(45) Date of Patent: Aug. 22, 2006

(54) METHOD AND SYSTEM FOR VERIFYING RESOURCE CONFIGURATION

(75) Inventors: David A. Graves, Monte Sereno, CA (US); Parvathi Nair, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 475 days.

(21) Appl. No.: 10/407,539

(22) Filed: Apr. 4, 2003

(65) Prior Publication Data

US 2004/0199756 A1    Oct. 7, 2004

(51) Int. Cl.
  *G06F 15/177* (2006.01)
(52) U.S. Cl. .......................................... 713/1; 713/100
(58) Field of Classification Search ................... 713/1, 713/100
  See application file for complete search history.

(56) References Cited

U.S. PATENT DOCUMENTS

| | | | | |
|---|---|---|---|---|
| 5,535,335 A | * | 7/1996 | Cox et al. ................... 709/221 |
| 5,761,505 A | * | 6/1998 | Golson et al. ............... 713/100 |
| 5,821,937 A | * | 10/1998 | Tonelli et al. ............... 715/853 |
| 6,185,569 B1 | * | 2/2001 | East et al. ................... 707/101 |
| 6,760,767 B1 | * | 7/2004 | Miesbauer et al. .......... 709/227 |
| 6,836,798 B1 | * | 12/2004 | Adams ........................ 709/223 |
| 2003/0187709 A1 | * | 10/2003 | Brodsky et al. ............... 705/7 |

\* cited by examiner

*Primary Examiner*—Thomas Lee
*Assistant Examiner*—Vincent Tran (57) ABSTRACT

A method and system for verifying resource configuration. Specifically, in one embodiment, the method begins by reading a map outlining a plurality of valid configuration attributes. The configuration attributes are associated with a plurality of computing resources that are interrelated in a network. The plurality of computing resources is then contacted and a plurality of actual configuration attributes from the plurality of computing resources is requested. Thereafter, the plurality of actual configuration attributes is compared to a plurality of corresponding valid configuration attributes provided from the map. A plurality of messages detailing results from the comparison of actual to valid configuration attributes is then generated.

24 Claims, 7 Drawing Sheets

Report 610

Pass Condition

Actual Configuration Attribute Listing ~ 615

Report 620

Fail Condition

Actual Configuration Attribute Listing ~ 625

Valid Configuration Attribute Listing ~ 627

Report 630

Warning Condition

Actual Configuration Attribute Listing ~ 635

Valid Configuration Attribute Listing ~ 637

Exception 710

Actual Configuration Attribute Listing ～715

Rule Reference That Actual Configuration
　　Atrribute Violates ～717

Exception 720

Actual Configuration Attribute Listing ～725

Rule Reference That Actual Configuration ～727
　　Atrribute Violates

Fig. 7

METHOD AND SYSTEM FOR VERIFYING RESOURCE CONFIGURATION

TECHNICAL FIELD

The various embodiments of the present invention relate to data centers of computing resources. More specifically, various embodiments of the present invention relate to the verification of attributes for the computing resources in a data center.

BACKGROUND ART

Modern networking continues to provide an improvement in communication and information access. As an example, in-house data centers, associated with a particular entity or interrelated group of users, could contain a large number of information technology (IT) resources that are interconnected through a network. The resources in the in-house data centers are managed by network administrators.

Traditional in-house data centers consist of a conglomerate of many unique IT environments. Each of the IT environments are grown and managed specific to the needs of their particular IT environment. As such, computing resources in each of the environments of the in-house data center are in part constantly being physically replaced, physically switched around from IT environment to IT environment, physically removed, physically added, etc.

Moreover, the IT environments are often patched together to form the in-house data center. As such, the network or data center of computing resources can be large and complex. This patchwork infrastructure containing the IT environments in the in-house data center can create a number of challenges. In particular, verification of attributes for computing resources in the in-house data center can be difficult and costly.

In the past, a manual process was implemented by a network administrator for the collection of attributes for computing resources in an in-house data center. The network administrator would login into each of the computing resources individually to start the manual process. Then, the network administrator would issue the necessary commands to display the configuration attributes of the queried computing resource. This procedure could take several minutes to collect the configuration attributes of a single device, leading to a tedious and inefficient use of personnel as well as computing resources.

Automated processes have been implemented in the prior art for the retrieval of configuration attributes for computing resources in an in-house data center. This automated process can be used for determining what computing resources are available and their status in each of the IT environments of the in-house data center. Automation of this process is particularly useful for keeping track of computing resources since each of the IT environments within the in-house data center are constantly changing with respect to the physical locations of computing resources and their use.

However, in the prior art, the automation of discovering configuration attributes for computing resoruces in an in-house data center was limited to discovery only. The network administrator would necessarily manually check to see if the proper computing resources, and their corresponding configuration attributes, were allocated to the correct IT environment. In other words, the network administrator must manually determine, in the prior art, whether the IT environments were configured correctly with the right computing resources to meet the IT environment's objectives and resource requests. This verification of computing resources through their attributes can be a complex and tedious process when manually performed by a network administrator especially with larger numbers of computing resources in each of IT environments in the in-house data center.

DISCLOSURE OF THE INVENTION

A method and system for verifying resource configuration is disclosed. Specifically, in one embodiment, the method begins by reading a map outlining a plurality of valid configuration attributes. The configuration attributes are associated with a plurality of computing resources that are interrelated in a network. The plurality of computing resources is then contacted and a plurality of actual configuration attributes from the plurality of computing resources is requested. Thereafter, the plurality of actual configuration attributes is compared to a plurality of corresponding valid configuration attributes provided from the map. A plurality of messages detailing results from the comparison of actual to valid configuration attributes is then generated.

BRIEF DESCRIPTION OF THE DRAWINGS

The above and other objects and advantages of the present invention will be more readily appreciated from the following detailed description when read in conjunction with the accompanying drawings, wherein.

BEST MODES FOR CARRYING OUT THE INVENTION

Reference will now be made in detail to embodiments of the present invention, a method and system for verifying configuration attributes of computing resources in a data center, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Embodiments of the present invention can be implemented on software running on a computer system. The computer system can be a personal computer, notebook computer, server computer, mainframe, networked computer, handheld computer, personal digital assistant, workstation, and the like. This software program is operable for providing real-time video and audio communication within a virtual environment. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "reading," or "contacting," or "requesting," or "determining," or "comparing," or "generating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for verifying configuration attributes of computing resources in a data center. As a result, other embodiments of the present invention serve the above purpose and provide for the automatic verification of configuration attributes, which results in greater time and cost efficiency in managing computing resources in a data center. In addition, other embodiments of the present invention serve the above purposes and provide for the automatic updating of listed attributes for computing resources in a data center. Furthermore, still other embodiments of the present invention serve the above purposes and provide for the discovery of unauthorized movement or presence of computing resources in a data center, resulting in improved tracking and management of computing resources in a data center.

Figure 1:
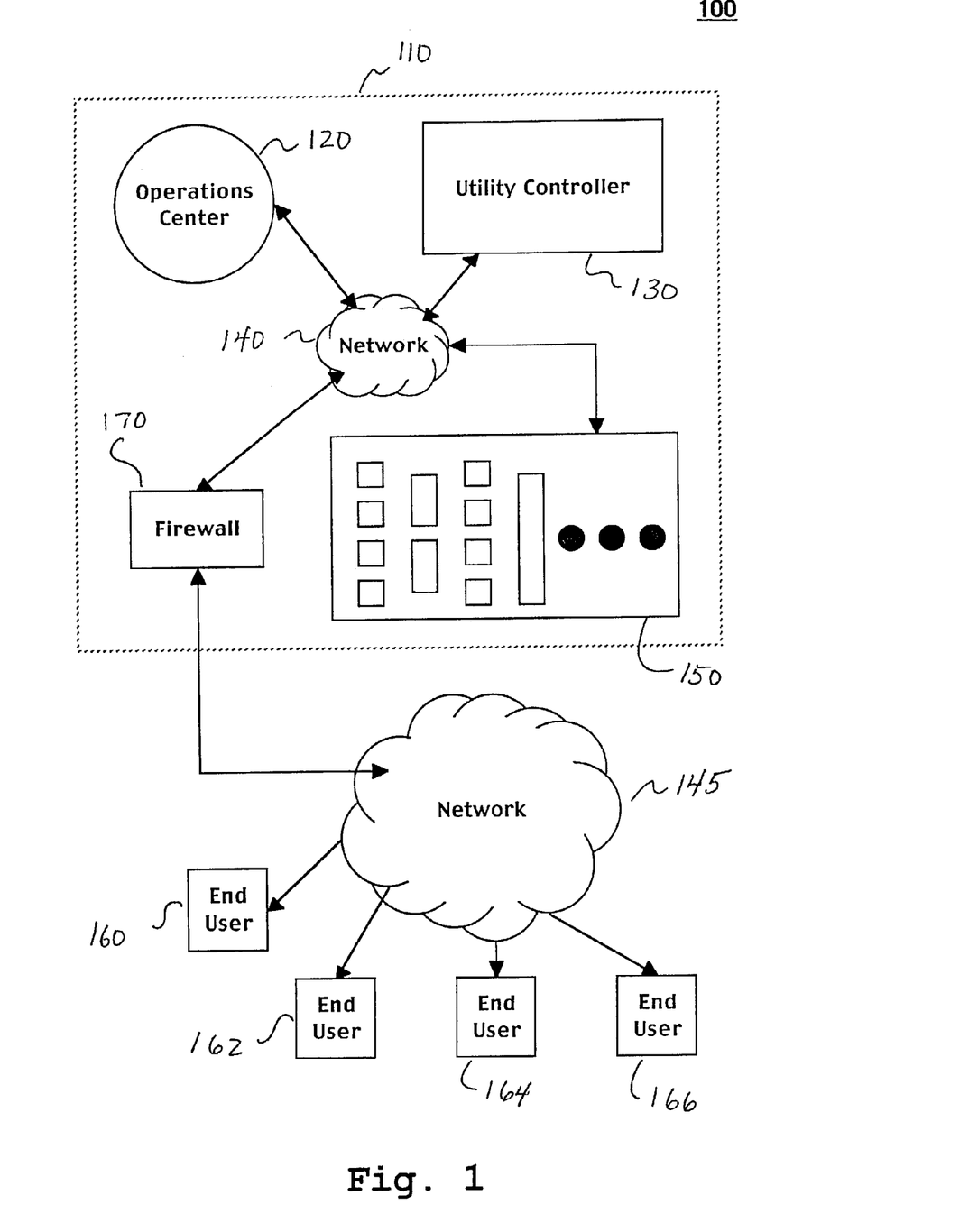
FIG. 1 is a block diagram illustrating a network system including a data center that is capable of dynamically and virtually allocating computing resources to a plurality of end users, in accordance with one embodiment of the present invention.

Referring now to FIG. 1, a block diagram of a networked system 100 illustrates the functionality of a utility data center (UDC) 110 with a plurality of end users, in accordance with one embodiment of the present invention. System 100 is comprised of the UDC 110 which is coupled through a network 145, such as, a virtual private network (VPN) or the Internet. The UDC is coupled to a plurality of end users (e.g., end users 160, 162, 164, 166, etc.) through the network 145. The UDC 100 is capable of verifying configuration attributes of its computing resources.

Although embodiments of the present invention disclose the discovery and verification of configuration attributes of computing resources in a data center, other embodiments are well suited to the verification of configuration attributes of computing resources in any data network. In addition, still other embodiments are well suited to the verification of configuration attributes of computing resources in a provisional data center.

The UDC 110 of FIG. 1 is comprised of an operations center 120 that is coupled through a network 140 (e.g., a local area network) to a utility controller 130, and a pool 150 of computing resources. The UDC 110 provides for a scalable and programmable solution for allocating computing resources that automates the creation, monitoring, and the metering of a wide variety of computing environments.

In one embodiment, the UDC 110 is a provisional UDC. As such, the UDC 110 utilizes a programmable infrastructure that enables the virtual connection of any computing resource as well as the isolation of a set of computing resources, thereby ensuring the security and segregation of computing resources at the lowest infrastructure level. As such, the UDC 110 can create and manage a plurality of virtual farms, each of which utilize a set of computing resources in the UDC 110.

The operations center 120 provides for overall control over the UDC 110. In one embodiment, the operations center 120 is manned by network technicians that monitor the management and allocation of computing resources in the UDC 110. The network technicians also provide for the installation and repair of physical resources in the pool 150 of computing resources. Also, the operations center acts as an interface between the UDC 110 and the plurality of end users. The operations center 120 can be coupled to the plurality of end users through the network 145. In addition, a firewall 170 can provide one form of additional security for the UDC 110 when communicating through the network 145.

The pool 150 of computing resources in the UDC 110 is comprised of a pre-wired, pre-integrated, and pre-tested plurality of physical resources that form a pool from which multiple farms can be created on demand. The computing resources include, but are not limited to, the following: servers, switches, computers, appliances (e.g., load balancers and firewalls), and network elements. The computing resources in the pool 150 are physically pre-wired (ideally a one-time wiring solution) and then dynamically, and logically re-wired into various virtual farm environments. The computing resources can be logically re-wired using virtual local area network technology (VLAN), in one embodiment.

In another embodiment, the UDC 110 supports multi-vendor and open system support for the plurality of computing resources in the pool 150. As such, the UDC 110 can provide support to computing resources in the pool 150 that have the same functionality (e.g., firewalls) but are provided by different vendors. Also, the UDC 110 can support the various operating systems that each of those computing resources may use.

The utility controller 130 enables the deployment segmentation, and management of resources and farms. The farms deployed with computing resources from the pool 150 can be tailored to meet a wide variety of services. Each farm has its own dedicated computing and appliance resources. The farms can share common resources, such as storage and networking fabric.

The utility controller 130 manages the pool 150 of computing resources in the UDC 110. Specifically, the utility controller 130 ensures the segmentation of farmns, thereby securely isolating one farm from other farms. Also, the utility controller 130 monitors all deployed farms, and automatically re-deploys replacement resources if there are any failures in computing resources detected. In addition, the utility controller 130 monitors shared infrastructure resources, alerting the operations center of failures or other significant events, such as, intrusion attempts.

Figure 2:
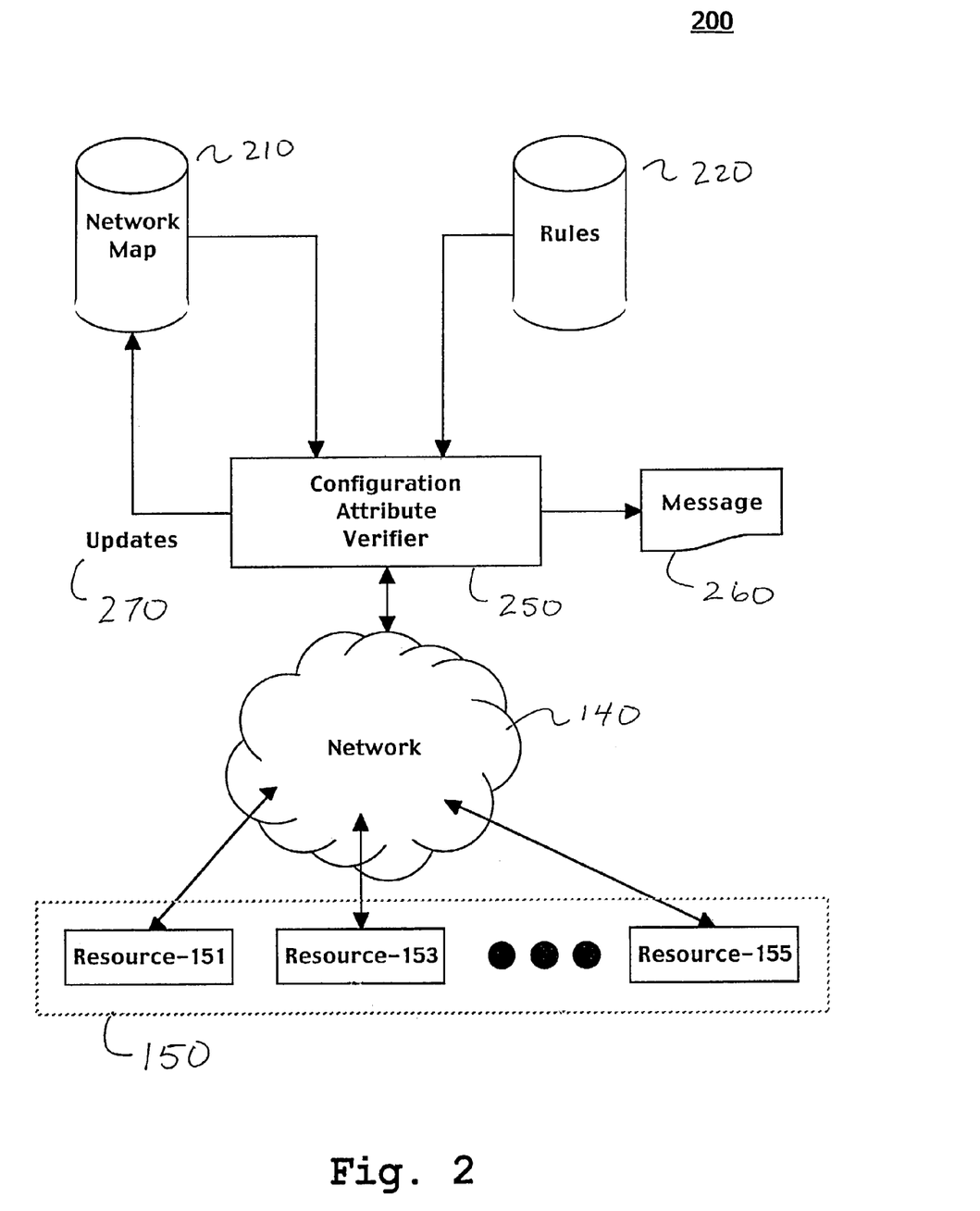
FIG. 2 is a data flow diagram illustrating the flow of information when automatically verifying configuration attributes in a data center, in accordance with one embodiment of the present invention.

FIG. 2 is a data flow diagram illustrating the flow of information between several elements of a system 200 that reside within a UDC, in accordance with one embodiment of the present invention. The system 200 provides for the verification of configuration attributes in a network of computing devices. By way of illustration only, the system 200 can reside on, or interact with, the UDC 110 of FIG. 1.

The system 200 is comprised of a configuration attribute verifier 250 that is coupled to a network map 210 and a set of rules 220. The configuration attribute verifier 250 is coupled to a network 140, as shown in FIG. 1, that is internal to the UDC 110 to provide communicable coupling with the pool 150 of computing resources (e.g., the first computing resource 151, the second computing resource 152, on up to the n$^{th}$ computing resource 155).

The network map 210 is a machine-readable network map. The network map 210 contains information pertaining to each of the computing resources in the pool 150. Specifically, the information contained within the network map includes configuration attributes. The configuration attributes provide device specific information necessary for determining how the specific computing resource can fulfill a farm objective, and how compatible that device is with other computing resources tasks to fulfill the same farm objective.

For example, the configuration attributes contained within the network map 210 and associated with each of the computing devices in the pool 150 discloses the type of device the computing resource is in one embodiment. For example, the type of device may include, but is not limited to, the following: switches, computers, load balancers, and firewalls, etc. In addition, another configuration attribute provides the network address for determining the network pathway to reach a specific computing device, in another embodiment. Further, other device specific representations of configuration attributes may include, but are not limited to the following: name, device make, model, serial number, MAC addresses, software version, and firmware version, etc.

In one case, the configuration attributes that are associated with the computing devices in a UDC are impermanent, and completely updateable or capable of being changed. For example, software applications and/or firmware are loaded onto a particular computing resource and can be changed or updated according to the needs of a user.

In another case, the configuration attributes that are associated with the computing devices in a UDC are permanent and are not capable of being changed. For example, permanent configuration attributes for a particular computing resource include, but are not limited to the following: the manufacturer, the model, how many ports are included in the computing resource, serial number, etc.

In addition, the system 200 of a UDC contains a plurality of rules 220. In one embodiment, the plurality of rules 220 is a rule database. The plurality of rules 220 defines the constraints for each attribute associated with the plurality of computing resources in a UDC.

In one embodiment, the plurality of rules apply to physical constraints of each of the computing resources in the pool included within a UDC. For example, for a particular computing resource, physically only two input/output (I/O) ports exist on the computing resource. In that case, a physical constraint associated with that computing resource is the fact that no more than two cables can be plugged into the computing resource. As such, a virtual farm requesting a computing resource with three I/O ports cannot use a computing resource that only has two computing resource.

In another embodiment, the plurality of rules apply to policy constraints that are put onto the computing resources in the UDC. For example, in a particular UDC, one policy constraint is that only specific models (e.g., those manufactured by corporation X) of computing resources that provide a particular function (e.g., firewalls) will be used.

The configuration attribute verifier 250 performs the validation or verification of the configuration attributes of each of the computing resources in the pool of computing resources of a particular UDC. In one embodiment, the configuration attribute verifier 250 performs the validation or verification automatically.

The configuration attribute verifier 250 generates a message report 260 that lists the results from the verification of the configuration attributes. The report 260 contains a message listing each instance where the actual configuration attributes differ from the valid configuration attributes that are reported in the map 210. In addition, the message report can list each instance where the actual configuration attribute are out of acceptable bounds are in violation of the bounds defined by the plurality of rules 220.

In one embodiment, the configuration attribute verifier 250 can update the network map 210 with updated information 270 for the configuration attributes that are stored in the network map 210. For example, if the computing resource that is presumably located in rack 2, slot 10 as defined by the network map 210 is different from actual configuration attributes obtained by the configuration attribute verifier 250, then the configuration attribute verifier 250 can change or update the information to reflect the actual configuration attribute information and include the updated information 270 in the network map.

Figure 3:
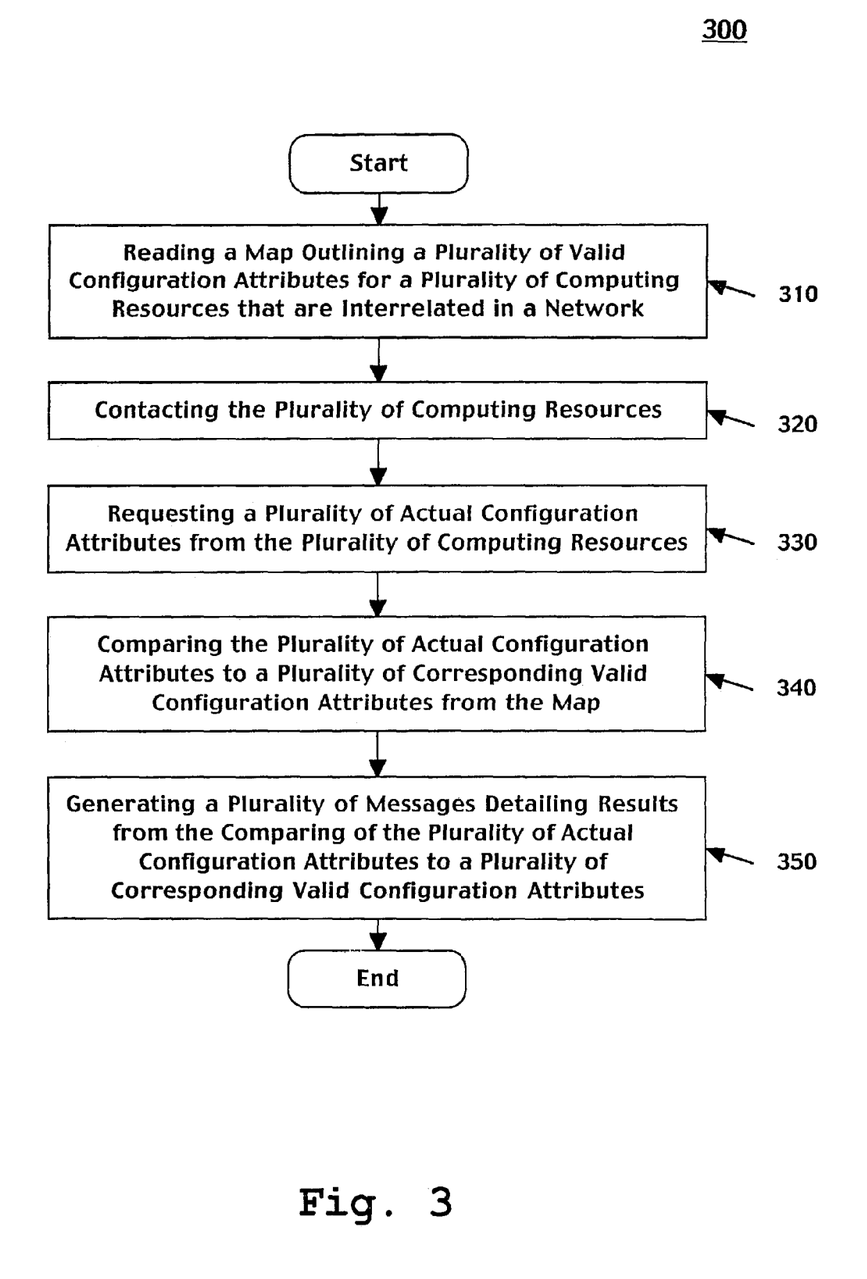
FIG. 3 is a flow chart illustrating steps in a method for verifying a plurality of configuration attributes associated with a plurality of computing resources in a data center, in accordance with one embodiment of the present invention.

FIG. 3 is a flow chart 300 illustrating steps in a computer implemented method for validating or verifying configuration attributes of computing resources in a UDC, in accordance with one embodiment of the present invention. The method as illustrated in flow chart 300 discloses in general the process of verifying configuration attributes of computing devices in a data center.

At step 310, the present embodiment begins by reading a map outlining a plurality of valid configuration attributes for a plurality of computing resources that are interrelated in a network. The network in general is a data center in one embodiment. More particularly, the network is a utility data center, as described previously, in another embodiment. Specifically, the network is a provisional utility data center, in one embodiment, wherein each of the plurality of computing resources are physically wired to the network, and thereafter logically rewired with other computing resources to form subsets (e.g., farms) of the plurality of computing resources. In general the computing resources in the network are dynamically and virtually allocated, reacquired, and reallocated according to the needs of various end users.

The map provides configuration attributes for each of the available computing resources that are included or associated with the network. In one embodiment, the configuration attributes are considered valid. Valid configuration attributes describe computing resources according to design. For example, when a customer sets up a network (e.g., a data center) that including a certain number of specific computing devices as per a particular design, the map describes the particular computing resources in the design. More particularly, the map discloses the valid configuration attributes of each of the computing resources that should be in the network.

At 320, the present embodiment continues by contacting the plurality of computing resources. As such, the present embodiment opens communication with each of the computing resources in the network in order to verify the configuration attributes that are contained in the map.

In one embodiment, to continue the above example, after setup and delivery of the network, the present embodiment can check and verify that the network as delivered corresponds to the design of the customer.

At 330, the present embodiment continues by requesting a plurality of actual configuration attributes from the plurality of computing resources. The actual configuration attributes disclose the physical characteristics of the actual physical devices in the network. Actual configuration attributes differ from valid configuration attributes in theory. Actual configuration attributes describe what exists in reality in a network. On the other hand, valid configuration attributes describe what should exist by design. For example, actual configuration attributes may describe a switch that is housed in tray 5 of rack 19 in a network. However, by design, the valid configuration attributes for tray 5, rack 19 describe a firewall.

At 340, the present embodiment continues by comparing the plurality of actual configuration attributes to a plurality of corresponding valid configuration attributes that are disclosed from the map. As such, the present embodiment verifies that the actual configuration attributes of computing resources in the network match the valid configuration attributes according to design.

To continue the above example of the previous paragraph, the present embodiment can verify to check to see that the computing device is properly loaded into tray 5 of rack 19 in a particular network, as ordered by a customer. The present embodiment, by implementing the method described in flow chart 300 will discover that the computing device that is physically loaded does not match the computing device as per design (e.g., a firewall by design, but a switch in actuality). This is accomplished by comparing the actual configuration attributes to the valid configuration attributes of the map.

At 350, the present embodiment continues by generating a plurality of messages detailing results from comparing the actual configuration attributes to the valid configuration attributes of the network. In this way, the generated message indicates whether the actual configuration attributes of the computing resources that physically exist in the network are correctly placed.

In one instance, the present embodiment generates a separate pass message in the plurality of messages for each of the plurality of actual configuration attributes that matches its corresponding valid configuration attribute. If the actual configuration attribute matches the valid configuration attribute according to the map, then the present embodiment generates a pass message for that valid configuration attribute. In essence, the pass message indicates that the valid configuration attribute has been verified. For example, a pass message may indicate that the firmware loaded onto a computing resource in the network is of the proper version, as verified against the valid configuration attribute of the map.

In another instance, the present embodiment generates a separate fail message in the plurality of messages for each of the plurality of actual configuration attributes that does not match its corresponding valid configuration attribute. If there is no match, then the present embodiment generates a fail message for that particular valid configuration attribute. In essence, the fail message indicates that the valid configuration attribute has not been verified. For example fail message may indicate that the firmware loaded onto a particular computing resource in the network is not of the proper version, as required by the valid configuration attribute of the map.

In still another instance, the present embodiment generates a separate warning message in the plurality of messages for each of the plurality of actual configuration attributes that does not match its corresponding valid configuration attribute, for those attributes that are optional according to a corresponding rule. The plurality of rules pertain to the plurality of valid configuration attributes of a network, and as described previously, the rules may be physical rules, compatibility rules, or policy rules, to name a few.

In one embodiment a listing of each of the plurality of actual configuration attributes that does not match its corresponding valid configuration attribute is presented in the plurality of messages. The listing relationally lists the actual configuration attribute with its corresponding valid configuration attribute. In that way, errors in the network are quickly identified, and the valid configuration attributes are presented to provide for a remedy.

In another embodiment, the map is updated when an actual configuration attribute does not match its corresponding valid configuration attribute. In the present case, the map is updated by substituting the corresponding valid configuration attribute in the map with the corresponding actual configuration attribute that is discovered by the present method of flow chart 300. In this embodiment, the map is updateable when a rule corresponding to the configuration attribute that is changed in the map allows for that change. As such, the present embodiment assumes that what actually exists is properly configured, and that the map should properly reflect what actually exists.

Typically, however, to maintain a unity of order, the computing resources are verified and changed in the network to match the valid configuration attributes by design in the map, in one embodiment. In this case, the overall flow and design of the network is maintained to ensure compatibility between computing resources in the network.

Figure 4:
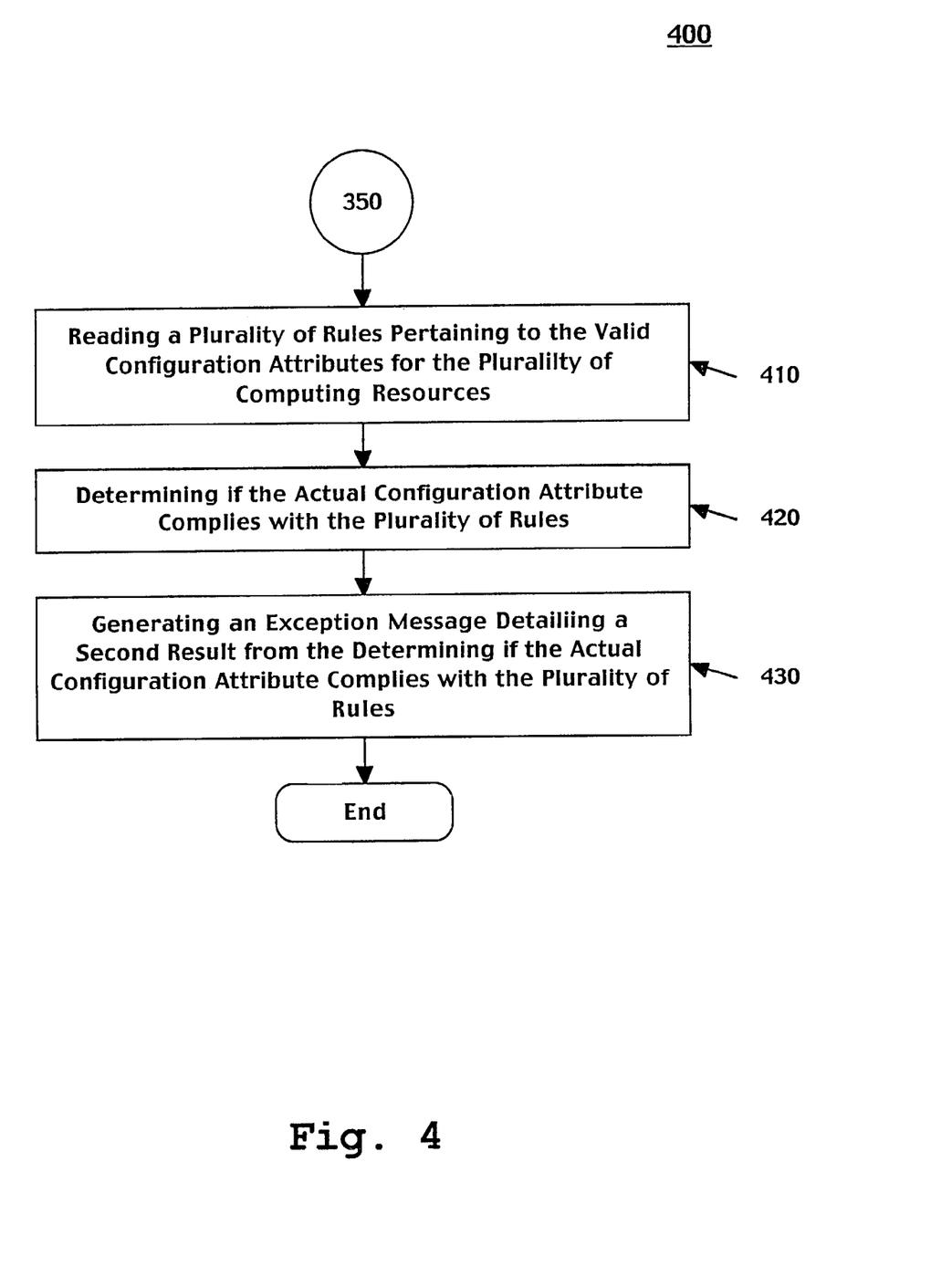
FIG. 4 a flow chart illustrating steps in a method for determining if a configuration attribute of a computing resource in a data center complies with a plurality of rules, in accordance with one embodiment of the present invention.

Referring now to FIG. 4, a flow chart 400 of computer implemented steps is disclosed for ensuring that computing resources in the network are compatible, in accordance with one embodiment of the present invention. The flow chart 400 is a continuation of the method of verification from 350 as described in flow chart 300, in one embodiment.

The present embodiment begins at 410 by a plurality of rules. The plurality of rules pertain to the plurality of valid configuration attributes of a network. As described previously, the rules may be physical rules, compatibility rules, or policy rules, to name a few. As an example, one physical rule may state the number of (I/O) ports for a particular computing resources. Another policy rule may state that only routers from a particular corporation may be used in the network. Still another physical rule indicates that for compatibility, only a specific group of routers can be used with a particular switch in the network.

At 420, the present embodiment continues by determining if the plurality of actual configuration attributes comply with the plurality of rules. For instance, for an actual configuration attribute that is received, the present embodiment checks to see if the actual configuration attribute complies those rules in the plurality of rules that pertain to the computing resource that is being verified. For example, the present embodiment may check to see if the firmware loaded onto a particular computing resource as disclosed by an actual configuration attribute is compatible with a software application running on a second computing resource, as set forth by a rule in the plurality of rules that govern the network.

At 430, the present embodiment continues by generating a separate exception message for each of the plurality of actual configuration attributes that is in violation of the plurality of rules. In particular, an exception message is generated that relationally lists the actual configuration attribute that is in violation and a reference to the corresponding rule that the actual configuration attribute is violating.

Figure 7:
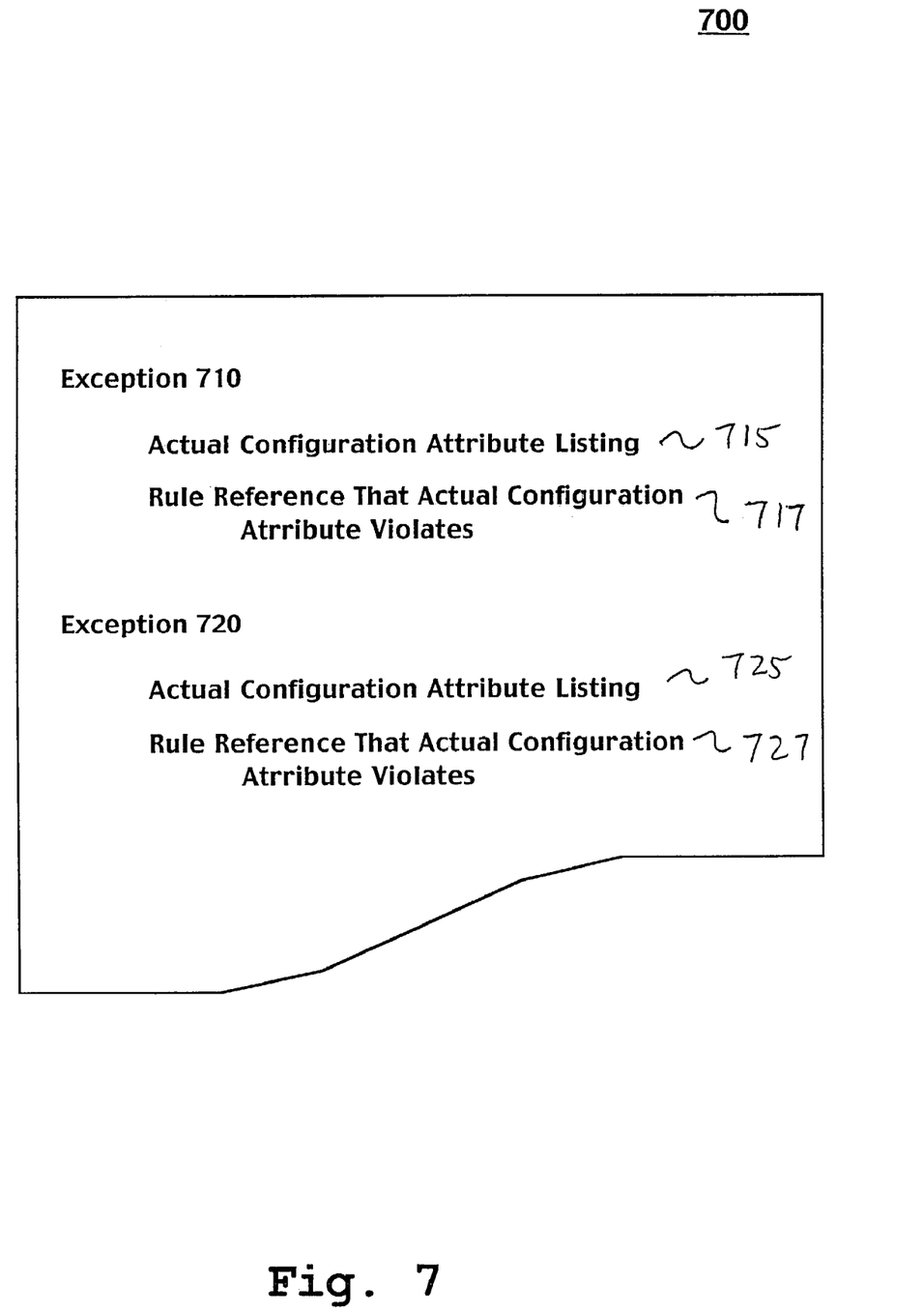
FIG. 7 is an exception report illustrating messages listing configuration attributes of computing resources that are in violation with a rule that governs resources in a data center, in accordance with one embodiment of the present invention.

FIG. 7 is an illustration of an exception report 700, in accordance with one embodiment of the present invention. The exception report 700 lists a plurality of exception reports, two of which are presented in report 700, exception message 710 and exception message 720.

The exception message 710 lists the actual configuration attribute of question in line 715. In that way, it can be understood for what reason the exception message 710 was generated. In addition, the exception message 710 also relationally lists the rule in line 717 that the actual configuration attribute is in violation. In that case, the compatibility problem that exists in the violation of the rule as presented in line 717 can be addressed. Similarly, the exception message 720 relationally lists the actual configuration attribute in line 725 and the rule that is violated in line 727.

Figure 5:
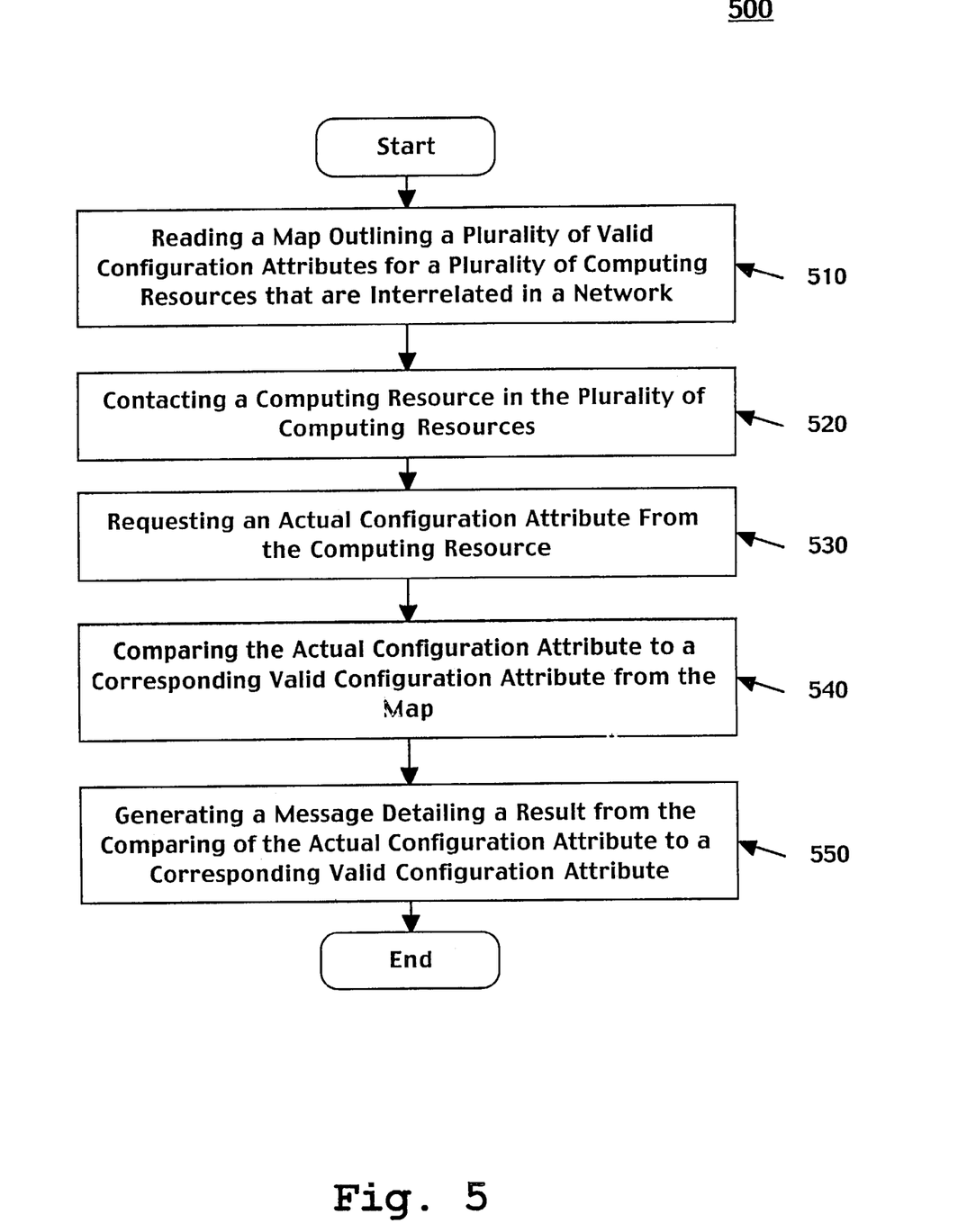
FIG. 5 is a flow chart illustrating steps in a method for verifying a configuration attribute of a computing resource in a data center, in accordance with one embodiment of the present invention.

Referring now to FIG. 5, a flow chart 500 illustrating steps in a computer implemented method for validating or verifying configuration attributes of computing resources in a network is disclosed, in accordance with one embodiment of the present invention. The method as illustrated in flow chart 500 discloses more specifically the process of verifying configuration attributes of computing devices in a data center.

At 510, the present embodiment begins by reading a map outlining a plurality of valid configuration attributes for a plurality of computing resources that are interrelated in the network (e.g., a data center, a utility data center, or a provisional utility data center). In general the computing resources in the network are dynamically and virtually allocated, reacquired, and reallocated according to the needs of various end users. As described previously, the map provides valid configuration attributes for each of the available computing resources that are included or associated with the network.

At 520, the present embodiment continues by contacting a computing resource in the network. As such, the present embodiment opens communication with the computing resource in the network in order to verify its configuration attributes that are contained in the map.

At 530, the present embodiment continues by requesting an actual configuration attribute from the computing resource. In the present embodiment, a specific configuration attribute of the computing resource is checked. The present embodiment is interested specifically with a particular piece of information regarding the computing device. In one embodiment, in a preliminary, step, the present embodiment preselects a valid configuration attribute to verify. In another embodiment, an actual configuration attribute of a computing device is selected first, and then the verification of the actual configuration attribute is made with a corresponding valid configuration attribute.

At 540, the present embodiment continues the verification by comparing the actual configuration attribute with a corresponding valid configuration attribute. In that way, the present embodiment can verify whether the network reflects the valid configuration attributes according to design.

At 550, the present embodiment continues by generating a message that details the result from comparing the actual configuration attribute to the corresponding valid configuration attribute as determined in 440.

In one instance, the present embodiment indicates a pass result in the message when the actual configuration attribute matches the corresponding valid configuration attribute. In another instance, the present embodiment indicates a fail result in the message when the actual configuration attribute does not match the corresponding valid configuration attribute. In still another instance, the present embodiment generates a separate warning message in the plurality of messages for each of the plurality of actual configuration attributes that does not match its corresponding valid configuration attribute, for those attributes that are optional according to a corresponding rule.

Figure 6:
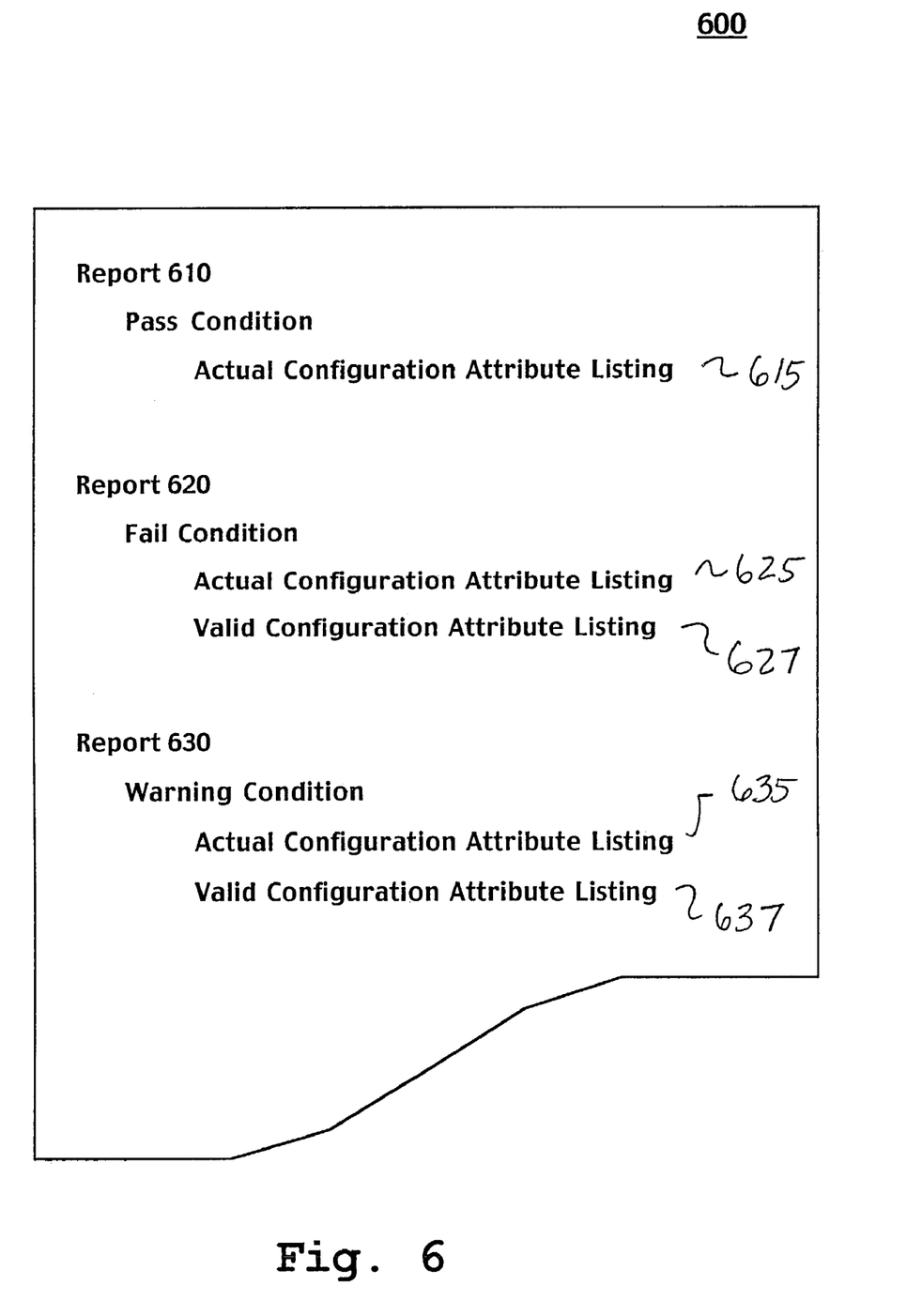
FIG. 6 is a condition report illustrating messages listing pass, fail, and warning conditions for configuration attributes of computing resources in a data center, in accordance with one embodiment of the present invention.

Referring now to FIG. 6, a report 600 lists pass, fail, and warning messages, in accordance with one embodiment. The report 600 illustrates a pass message 610, a fail message 620, and a warning message 630. The pass message 610 indicates a pass result when the actual configuration attributes matches a corresponding valid configuration attribute. In that case, the pass message 610 can list either the actual configuration attribute as indicated in line 615, or the valid configuration attribute, since the information is the same for both.

The fail message 620 indicates a fail result when the actual configuration attribute does not match the corresponding valid configuration attribute. To provide sufficient information leading to a solution, the fail message 620 provides for a listing of the actual configuration attribute in line 625, and relationally provides a listing of corresponding valid configuration attribute in line 627. In that way, the mismatch problem indicating that the design of the network is not being complied with can be addressed.

The warning message 630 indicates a warning result when the actual configuration attribute does not match the corresponding valid configuration attribute. In addition, the configuration attribute is optional according to a corresponding rule. To provide sufficient information leading to a solution, the warning message 630 provides for a listing of the actual configuration attribute in line 635, and relationally provides a listing of corresponding valid configuration attribute in line 637.

Returning back to flow chart 500, in one embodiment, the method of flow chart 500 continues to check all the configuration attributes of the computing resource in question. This process is accomplished by first requesting a second actual configuration attribute from the same computing resource in question, and, requesting a second actual configuration attribute. Then, the second actual configuration attribute is compared to a corresponding second valid configuration attribute from said map. Finally, a second message is generated that details the results of the comparison of the second actual configuration attribute to its corresponding configuration attribute.

In another embodiment, the method of flow chart 500 continues to check all the configuration attributes of all the computing resources in the network. This process is accomplished by first requesting a second actual configuration attribute from a second computing resource in the plurality of computing resources of the network. Then, the embodiment compares the second actual configuration attribute to a corresponding second valid configuration attribute from the map. Thereafter, a second message is generated that details the results of the comparison of the second actual configuration attribute to its corresponding configuration attribute.

In another embodiment, the methods as described in flow charts 300, 400, and 500 are performed automatically. In that case, the utility data center can perform tests automatically to check the operational capability of computing resources in the network. The checks can be done on the entire network, or on particular areas of the network. For example, the verification of configuration attributes can be isolated to checking only attributes of firewalls in the network. Still in another embodiment, the verification of configuration attributes can be isolated to checking only configuration attributes of a specific farm of the network.

A method and system for verifying configuration attributes of interrelated computing resources is thus described. While the invention has been illustrated and described by means of specific embodiments, it is to be understood that numerous changes and modifications may be made therein without departing from the spirit and scope of the invention as defined in the appended claims and equivalents thereof. Furthermore, while the present invention has been described in particular embodiments, it should be appreciated that the present invention should not be construed as limited by such embodiments, but rather construed according to the below claims.

What is claimed is:

1. A method for verifying resource configuration comprising:
   a) reading a map outlining a plurality of valid configuration attributes for a plurality of computing resources that are interrelated in a network;
   b) contacting said plurality of computing resources;
   c) requesting a plurality of actual configuration attributes from said plurality of computing resources;
   d) comparing said plurality of actual configuration attributes to a plurality of corresponding valid configuration attributes from said map;
   e) generating a plurality of messages detailing results from said comparing in d);
   f) a plurality of rules pertaining to said plurality of valid configuration attributes; and
   g) determining if said plurality of actual configuration attributes comply with said plurality of rules; and
   h) generating a separate exception message for each of plurality of actual configuration attributes that is in violation of said plurality of rules, wherein h) further comprises:
     h1) for each said separate exception message that is generated, listing one of said plurality of actual configuration attributes that is in violation of said plurality of rules; and
     h2) relationally listing a reference to a corresponding rule that is violated.

2. The method as described in claim 1, wherein e) comprises:
   e1) generating a separate pass message in said plurality of messages for each of said plurality of actual configuration attributes that matches its corresponding valid configuration attribute.

3. The method as described in claim 1, wherein e) comprises:
   e1) generating a separate fail message in said plurality of messages for each of said plurality of actual configuration attributes that does not match its corresponding valid configuration attribute.

4. The method as described in claim 3, wherein e1) further comprising:
   listing each of said plurality of actual configuration attributes that does not match its corresponding valid configuration attribute; and
   for each of said plurality of actual configuration attributes that does not match its corresponding valid configuration attribute, relationally listing its corresponding valid configuration attribute.

5. The method as described in claim 1, further comprising:
   updating said map when an actual configuration attribute does not match its corresponding valid configuration attribute by substituting said corresponding valid configuration attribute with said actual configuration attribute when a rule associated with said actual configuration attribute allows for said updating of said map.

6. The method as described in claim 1, wherein said plurality of computing resources comprises a data center.

7. The method as described in claim 6, wherein said data center comprises a provisional data center, wherein each of said plurality of computing resources are physically wired to said network and logically rewired with other computing resources to form a subset of said plurality of computing resources.

8. The method as described in claim 1, wherein said reading in a), said contacting in b), said requesting in c), said comparing in d), and said generating in e) are performed automatically.

9. The method as described in claim 1, wherein e) comprises:
   e1) generating a separate warning message in said plurality of messages for each of said plurality of actual configuration attributes that are optional according to a plurality of associated rules, and that does not match it corresponding valid configuration attribute.

10. A method for verifying resource configuration comprising:
   a) reading a map outlining valid configuration attributes for a plurality of computing resources that are interrelated in a network;

b) contacting a first computing resource in said plurality of computing resources;
c) requesting an actual configuration attribute from said first computing resource;
d) comparing said actual configuration attribute to a corresponding valid configuration attribute from said map; and
e) generating a message detailing a result from said comparing in d);
f) a plurality of rules pertaining to said valid configuration attributes for said plurality of computing resources; and
g) determining if said actual configuration attribute complies with said plurality of rules; and
h) generating an exception message detailing a second result from said determining in g) when said actual configuration attribute is in violation of a rule of said plurality of rules, wherein h) further comprises:
h1) listing said actual configuration attribute in said exception message; and
h2) listing a reference to said rule that said actual configuration attribute is in violation in said exception message.

11. The method as described in claim 10, wherein e) comprises:
e1) indicating a pass result in said message when said actual configuration attribute matches said corresponding valid configuration attribute;
e2) indicating a fail result in said message when said actual configuration attribute does not match said corresponding valid configuration attribute; and
e3) indicating a warning result in said message when said actual configuration attribute does not match said corresponding valid configuration attribute, and when said actual configuration attribute is optional according to an associated rule.

12. The method as described in claim 10, wherein e) comprises:
e1) indicating a fail result in said message when said actual configuration attribute does not match said corresponding valid configuration attribute, wherein said message further comprises:
a listing of said actual configuration attribute; and
a listing of said corresponding configuration attribute.

13. The method as described in claim 10, further comprising:
updating said map by substituting said corresponding valid configuration attribute with said actual configuration attribute when said actual configuration attribute does not match said corresponding valid configuration attribute.

14. The method as described in claim 10, further comprising:
f) requesting a second actual configuration attribute from said first computing resource;
g) comparing said second actual configuration attribute to a corresponding second valid configuration attribute from said map; and
h) generating a second message detailing a second result from said comparing in g).

15. The method as described in claim 10, further comprising:
f) requesting a second actual configuration attribute from a second computing resource in said plurality of computing resources;
g) comparing said second actual configuration attribute to a corresponding second valid configuration attribute from said map; and
h) generating a second message detailing a second result from said comparing in g).

16. A data center comprising:
a bus for communicating information associated with a method for verifying resource configuration;
a processor coupled to said bus for processing said information associated with said method for verifying resource configuration; and
a computer readable memory coupled to said processor containing program instructions, that when executed by said processor, implement a method for verifying resource configuration comprising:
a) reading a map outlining a plurality of valid configuration attributes for a plurality of computing resources that are interrelated in a network;
b) contacting said plurality of computing resources;
c) requesting a plurality of actual configuration attributes from said plurality of computing resources;
d) comparing said plurality of actual configuration attributes to a plurality of corresponding valid configuration attributes from said map; and
e) generating a plurality of messages detailing results from said comparing in d);
f) a plurality of rules pertaining to said plurality of valid configuration attributes; and
g) determining if said plurality of actual configuration attributes comply with said plurality of rules; and
h) generating a separate exception message for each of plurality of actual configuration attributes that is in violation of said plurality of rules, wherein h) further comprises:
h1) for each said separate exception message that is generated, listing one of said plurality of actual configuration attributes that is in violation of said plurality of rules; and
h2) relationally listing a reference to a corresponding rule that is violated.

17. The data center as described in claim 16, wherein e) in said method comprises:
e1) generating a separate pass message in said plurality of messages for each of said plurality of actual configuration attributes that matches its corresponding valid configuration attribute.

18. The data center as described in claim 16, wherein e) in said method comprises:
e1) generating a separate fail message in said plurality of messages for each of said plurality of actual configuration attributes that does not match its corresponding valid configuration attribute.

19. The data center as described in claim 18, wherein e1) in said method further comprises:
listing each of said plurality of actual configuration attributes that does not match its corresponding valid configuration attribute; and
for each of said plurality of actual configuration attributes that does not match its corresponding valid configuration attribute, relationally listing its corresponding valid configuration attribute.

20. The data center as described in claim 16, wherein said method further comprises:
updating said map when an actual configuration attribute does not match its corresponding valid configuration attribute by substituting said corresponding valid configuration attribute with said actual configuration attribute when a rule associated with said actual configuration attribute allows for said updating of said map.

21. The data center as described in claim 16, wherein said plurality of computing resources comprises a data center.

22. The data center as described in claim 21, wherein said data center comprises a provisional data center, wherein each of said plurality of computing resources are physically wired to said network and logically rewired with other computing resources to form a subset of said plurality of computing resources.

23. The data center as described in claim 16, wherein in said method said reading in a), said contacting in b), said requesting in c), said comparing in d), and said generating in e) are performed automatically.

24. The data center as described in claim 16, wherein e) in said method comprises:
 e1) generating a separate warning message in said plurality of messages for each of said plurality of actual configuration attributes that are optional according to a plurality of associated rules, and that does not match it corresponding valid configuration attribute.

* * * * *

UNITED STATES PATENT AND TRADEMARK OFFICE
CERTIFICATE OF CORRECTION

PATENT NO. : 7,096,350 B2
APPLICATION NO. : 10/407539
DATED : August 22, 2006
INVENTOR(S) : David A. Graves et al.

It is certified that error appears in the above-identified patent and that said Letters Patent is hereby corrected as shown below:

On the Title page, in Item (75), in "inventors" in column 1, line 3, after "(US)", insert
-- ; Narendra Lakshminarasimha, Sunnyvale, CA (US) --.

In column 1, line 14, delete "Modem" and insert -- Modern --, therefor.

In column 5, line 24, delete "farmns" and insert -- farms --, therefor.

Signed and Sealed this

Twelfth Day of January, 2010

David J. Kappos
*Director of the United States Patent and Trademark Office*